United States Patent
Kuo

(10) Patent No.: US 7,327,116 B2
(45) Date of Patent: Feb. 5, 2008

(54) STEPPER MOTOR ACCELERATING SYSTEM AND METHOD

(75) Inventor: Ping-Hung Kuo, Taipei (TW)

(73) Assignee: Transpacific Plasma, LLC, Taipei (TW)

( * ) Notice: Subject to any disclaimer, the term of this patent is extended or adjusted under 35 U.S.C. 154(b) by 0 days.

(21) Appl. No.: 11/510,348

(22) Filed: Aug. 25, 2006

(65) Prior Publication Data

US 2006/0284589 A1    Dec. 21, 2006

Related U.S. Application Data

(63) Continuation of application No. 11/041,957, filed on Jan. 26, 2005, now Pat. No. 7,116,074.

(30) Foreign Application Priority Data

Aug. 20, 2004  (TW) .............................. 93125274 A

(51) Int. Cl.
*H02P 8/00* (2006.01)
(52) U.S. Cl. .................. 318/696; 318/685; 310/49
(58) Field of Classification Search ............... 318/696, 318/685
See application file for complete search history.

(56) References Cited

U.S. PATENT DOCUMENTS

| | | | | | |
|---|---|---|---|---|---|
| 3,644,812 | A | * | 2/1972 | Bitto et al. ................. | 318/254 |
| 3,813,592 | A | * | 5/1974 | Ryberg ....................... | 318/696 |
| 4,122,919 | A | | 10/1978 | Anzai ........................ | 187/29 R |
| 4,254,371 | A | * | 3/1981 | Scholten ..................... | 318/685 |
| 4,280,084 | A | * | 7/1981 | Chiang ....................... | 318/696 |
| 4,446,412 | A | * | 5/1984 | Friedman et al. ........... | 318/696 |
| 4,700,120 | A | | 10/1987 | Janes ......................... | 318/696 |
| 4,714,867 | A | | 12/1987 | Palmin et al. .............. | 318/696 |
| 4,962,976 | A | * | 10/1990 | Takahashi et al. .......... | 318/811 |
| 5,392,706 | A | * | 2/1995 | Drew et al. ................. | 101/170 |
| 5,640,075 | A | * | 6/1997 | Brasseur et al. ............ | 318/685 |
| 5,838,132 | A | | 11/1998 | Tanaka ....................... | 318/685 |
| 5,889,379 | A | | 3/1999 | Yanagi et al. ............... | 318/696 |
| 6,054,835 | A | | 4/2000 | Thiemann et al. .......... | 318/685 |
| 6,285,155 | B1 | | 9/2001 | Maske et al. ............... | 318/685 |
| 6,459,229 | B1 | | 10/2002 | Kawanabe .................. | 318/696 |

* cited by examiner

*Primary Examiner*—Rita Leykin
(74) *Attorney, Agent, or Firm*—Workman Nydegger

(57) ABSTRACT

A stepper motor accelerating system is used for accelerating a stepper motor from a current rotational speed to a target rotational speed. The stepper motor accelerating system comprises a controller, a pulse generator, and a driver. The controller stores a safety acceleration curve. The safety acceleration curve is defined by shifting a characteristic curve of the stepper motor with a safety margin. The controller compares the current rotational speed and the target rotational speed with the safety accelerating curve, and then gets two corresponding points on the safety accelerating curve. The controller generates a real accelerating curve based on these two corresponding points. The pulse generator receives the real accelerating curve and converts to a pulse signal. The driver receives the pulse signal, and then drives the stepper motor with the pulse signal. The present invention accelerates the stepper motor base on the safety accelerating curve. By this way, the present invention is able to prevent the stepper motor from out-of-speed or out-of-step.

14 Claims, 4 Drawing Sheets

US 7,327,116 B2

STEPPER MOTOR ACCELERATING SYSTEM AND METHOD

CROSS-REFERENCE TO RELATED APPLICATIONS

The present application is a continuation of U.S. application Ser. No. 11/041,957 filed Jan. 26, 2005 now U.S. Pat. No. 7,116,074. Said application Ser. No. 11/041,957 claims the benefit of Taiwan Application No. 93125274 filed Aug. 20, 2004.

BACKGROUND OF THE INVENTION

1. Field of the Invention

The present invention relates to an accelerating system and method for a stepper motor, and in particular to an accelerating system and method using a safety accelerating curve which is similar to the characteristic curve of the stepper motor, to accelerate a stepper motor.

2. Prior Art

The conventional stepper motor is controlled by a micro controller. After the micro controller outputting a control signal, the control signal would be amplified by a driver, and then control the operation of the stepper motor. The control signal is usually like pulse signal. The frequency of the control signal is proportional to the rotational speed of the stepper motor. For example, 200 pulses per second could make the stepper motor to rotate a circle. That means that the higher pulse per second generated by the controller would make the stepper motor rotate in a higher rotational speed. But there is an inverse exponent ratio between the rotational speed and the torque of the stepper motor. Namely the higher rotational speed would generate the smaller torque. So, it must be very careful to accelerate the stepper motor to prevent the stepper motor from "out-of-step" or "out-of-speed".

Referring to FIG. 1, which is a graph of a characteristic curve of a conventional stepper motor. The x-coordinate in the FIG. 1 shows the pulse per second received by the stepper motor. The y-coordinate in the FIG. 1 shows the output torque of stepper motor. The different characteristic between the stepper motor and the normal motor is that the stepper motor has two characteristic curves. The description of the two characteristic curves A and B shown in FIG. 1 is as below:

A: Pull-In Torque Curve
  the pull-in torque curve shows the maximum torque the stepper motor which can synchronously start or stop following the control signals. Therefore, in the region below the pull-in torque, the stepper motor could be real-time started, stopped, positive and reverse rotated as the control signal requested. This region is always called start-stop region.

B: Pull-Out Torque Curve
  the pull-out torque curve shows the maximum torque for the stepper motor which can synchronously operate following the control signal but can not immediately start or stop following the control signal. Between the pull-out torque curve and the pull-in torque curve, the stepper motor operates with the control signal but can't be started or stopped immediately. Beyond the pull-out torque curve, the stepper motor could not be operated. The region between the pull-out torque curve and the pull-in torque curve is called slew region. The stepper motor should be started or stopped in the start-stop region and then could be operated in the slew region. Otherwise, the stepper would be out-of-step.

"Out-of-speed" means the rotational speed of the rotor in the stepper motor can't follow the rotational speed of the stator magnetic field. This would cause the stepper motor stop rotating. "Out-of-speed" would happen in every kind of motor. In the normal motor, "Out-of-speed" will cause the coil burning. Relatively, in the stepper motor, "Out-of-speed" only stops the stepper motor and don't cause the coil burning, even the exciter coil still exciting the magnetic fields, due to the stepper motor is controlled by the pulse signal.

"Out-of-step" means the stepper motor would slide out when the decreasing output torque can not afford the load of the stepper motor. Because the output torque is inverse proportional to the rotational speed, the rotational speed of the stepper motor raised in a short time will cause the output torque decreasing immediately.

The conventional stepper motor mostly are applied in the low speed region, so the linear accelerating method is usually used to accelerate the conventional stepper motor. Referring to FIG. 2, which shows the conventional accelerating curve adapted in the conventional stepper motor. The x-coordinate in the FIG. 2 shows the pulses per second received by the stepper motor. The y-coordinate in the FIG. 2 shows the output torque of stepper motor. The linear accelerating method can be applied when the conventional stepper motor is operated in the low speed region because the output torque still remains in the start-stop region and not cause any trouble. But when the stepper motor is accelerated with the rate in the high speed region, the accelerating curve will enter into the slew region and finally exceed the pull-out torque curve. In the conventional technology the pull-out torque curve is always supposed to be linear, but the accelerating line according to the linear accelerating method would easily cross the pull-out torque curve and then result the stepper motor having the trouble of "out-of-speed" (as the line C shown in FIG. 2). Moreover, because in the linear accelerating method the characteristic of the stepper motor is not considered, so the stepper motor can not guarantee to offer the desired output torque according to the linear accelerating method. Under this condition, the stepper motor can't afford the load and will be trapped in "out-of-step".

SUMMARY OF THE INVENTION

An object of the present invention is to provide a stepper motor accelerating system and method which are adapted a safety accelerating curve to prevent the stepper motor out of the pull-out torque during the accelerating procedure.

Another object of the present invention is to provide a stepper motor accelerating system and method which provide sufficient torque in the high rotational speed to prevent the stepper from "out-of-step".

The present invention provides a stepper motor accelerating system for accelerating a stepper motor from a current rotational speed to a target rotational speed. The stepper motor comprises a controller, a pulse generator, and a driver.

The stepper motor has a characteristic accelerating curve which defines the relationship between the input pulse signal and the output torque of the stepper motor. A controller comprises data which are compiled from a safety accelerating curve. The safety accelerating curve is generated by subtracting a safety margin from the characteristic curve. According to a corresponding point of the current rotational speed and a corresponding point of the target rotational speed in the safety accelerating curve, the controller generates a real accelerating curve which is compiled to data. The pulse generator is used for receiving the data represented the real accelerating curve and then transferring the data to a pulse signal. A driver is used for receiving the pulse signal and then driving the stepper motor accelerating to the target rotational speed in accordance with the real accelerating curve.

In one aspect of the stepper motor accelerating system provided by the present invention, the characteristic curve is a pull-out torque curve.

In another aspect of the stepper motor accelerating system provided by the present invention, the safety accelerating curve is a quadratic curve.

In another aspect of the stepper motor accelerating system provided by the present invention, the real accelerating curve is equal to the safety accelerating curve.

In another aspect of the stepper motor accelerating system provided by the present invention, the real accelerating curve is a line between the corresponding point of the current rotational speed and a corresponding point of the target rotational speed.

In another aspect of the stepper motor accelerating system provided by the present invention, the safety accelerating curve comprises a line component and a quadratic curve component. The line component is extended horizontally from the corresponding point of the current rotational speed to a middle point in the safety accelerating curve. The quadratic curve component is initialed from the middle point to a corresponding point of the target rotational speed in the safety accelerating curve.

According to the above description, the accelerating curve adapted in the present invention is quite similar to the characteristic curve but spaced at a safety margin with the characteristic curve. Therefore, the stepper could be accelerated in the safety region, and the "out-of-step" and "out-of-speed" won't be happen in the present invention.

Other objects, advantages, and novel features of the present invention will become more apparent from the following detailed description when taken in conjunction with the accompanying drawings, in which:

DETAILED DESCRIPTION OF THE PRESENT INVENTION

Figure 3:
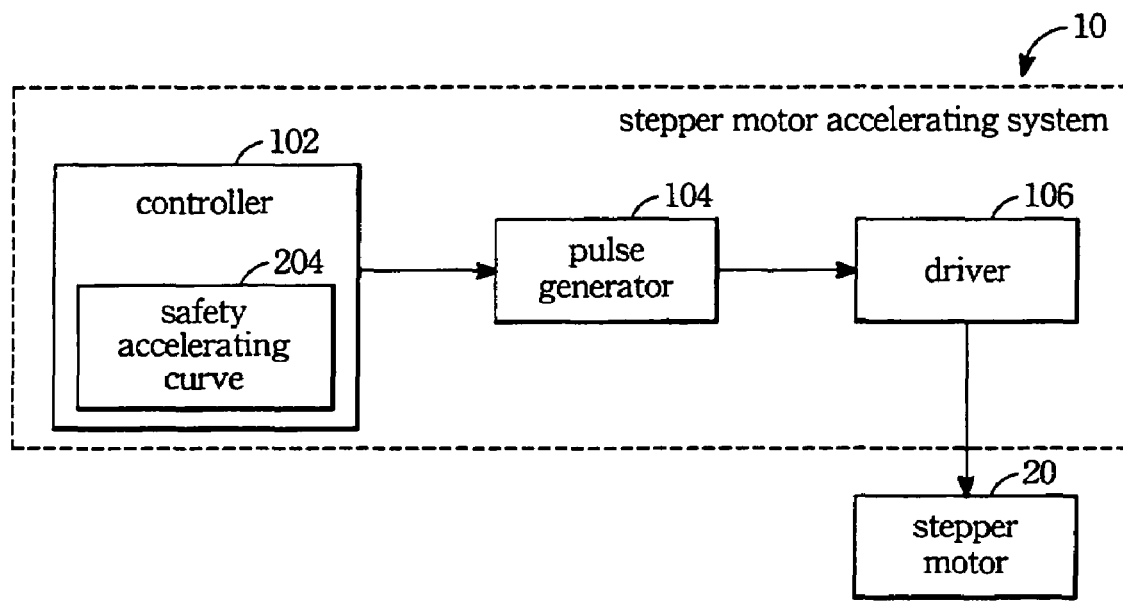
FIG. 3 is a block diagram of the stepper motor accelerating system and a stepper motor according to the present invention.

Referring to FIG. 3, which is a block diagram of the stepper motor accelerating system 10 and a stepper motor 20 according to the present invention. The present invention provides a stepper motor accelerating system 10 for accelerating a stepper motor 20 from a current rotational speed to a target rotational speed. The stepper motor 10 comprises a controller 102, a pulse generator 104, and a driver 106.

Figure 1:
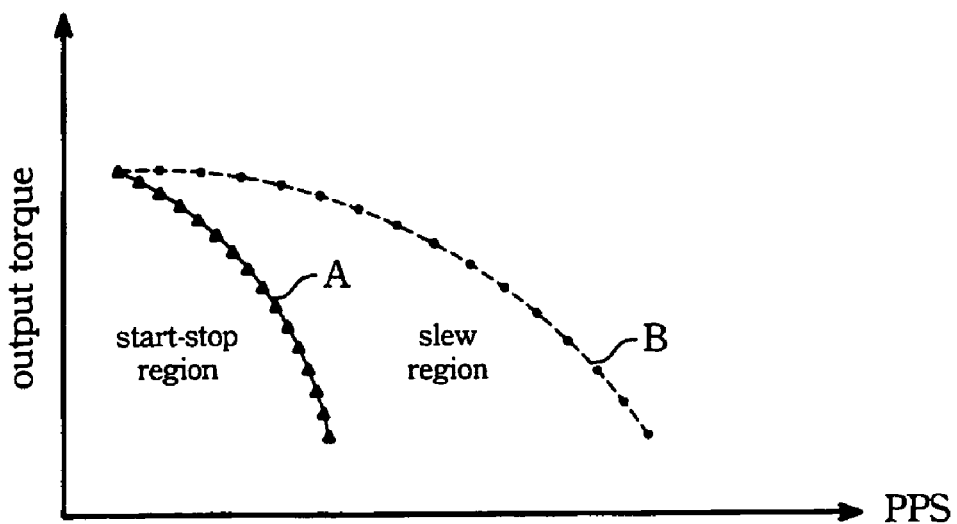
FIG. 1 is a graph of a characteristic curve of a conventional stepper motor.

As described in the prior art, the stepper motor has a characteristic accelerating curve as shown in FIG. 1. The characteristic curve can't be predicted. There have to do a lot of tests to get the characteristic curve of the stepper motor 20. Each test is to input pulse signals with different pulse per second (PPS) and to record the output torque of the stepper motor. On the other hand, the characteristic curve is composed by a lot of dots. For example, doing a hundred tests, then getting a hundred dots, and then connecting the hundred dots can get the characteristic curve of the stepper motor being tested. As shown in FIG. 1, each stepper motor has two main characteristic curves, one is pull-in torque curve; the other is pull-out torque curve.

Figure 4:
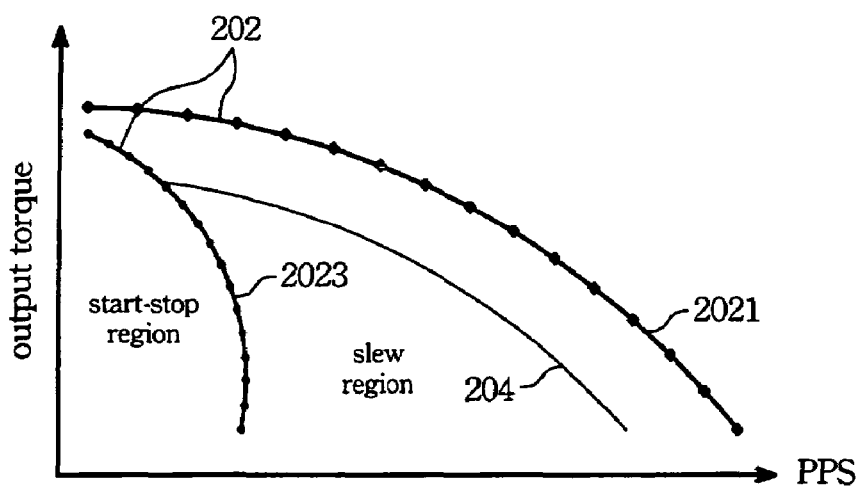
FIG. 4 is a graph of the characteristic curve, the safety accelerating curve, and the real accelerating curve of the stepper motor.

Referring to FIG. 4, which is a graph of the characteristic curve 202, the safety accelerating curve 204, and the real accelerating curve of the stepper motor 20. The x-coordinate shows the pulses per second received by the stepper motor 20. The y-coordinate shows the output torque of the stepper motor 20. As description above, the stepper motor 20 has two characteristic curves, one is a pull-out torque curve 2021; the other is a pull-in torque curve 2022. Because the stepper motor have to be operated below the pull-out torque curve 2021 to prevent "out-of-step" and "out-of-speed", the embodiments of the present invention introduces a safety accelerating curve 204 which is obtained by shifting the pull-out torque curve 2021 downward with a safety margin as shown in FIG. 4 to accelerate the stepper motor 20.

The safety accelerating curve generating method in embodiments of the present invention comprises the following steps. First, grab a plurality of pull-out dots of the pull-out torque curve 2021. Second, shift each pull-out dot downward along the normal line, which intersects orthogonally with the pull-out torque curve 2021 at the original position of the pull-out dot, with a safety margin to generate a plurality of safety dots. Then, do the curve fitting to fit the plurality of safety dots and then get a quadratic equation to represent the safety dots. The curve graphed from the quadratic equation could be viewed as a safety accelerating curve 204 illustrated in FIG. 4.

The curve fitting step is to use a formula to fit the plurality of safety dots. For example, first, presume the safety accelerating curve is:

$$T(f)=a \times f^2 + b \times f + r \quad (1)$$

wherein $f$ is input pulses per second, $T(f)$ is an output torque T function of pulses per second $f$, a, b, and r are factors.

Therefore, input at least three dots into the above equation (1) can get the three factors of a, b, and r. This is a simple process for explaining the curve fitting. In real practice, the curve fitting is a very common technology, there has many software in the market has function to do the curve fitting more complexity and precisely.

Due to the safety accelerating curve 204 is a quadratic equation; it can be compiled into the controller 102. The controller 102 is used for controlling the stepper motor to rotate at different rotational speed. When the controller 102 controls the stepper motor 20 to change the rotational speed, the controller 102 would first find the point of the current rotational speed and the point of the target rotational speed on the safety curve and then determine a real accelerating curve. The real accelerating curve is the base for the controller 102 to accelerate the stepper motor 20.

In the first embodiment of the present invention, the controller applys the safety accelerating curve 204 to be the real accelerating curve. The controller 102 takes the current rotational speed as the initial point and takes the target rotational speed as the final point of this acceleration.

Figure 5:
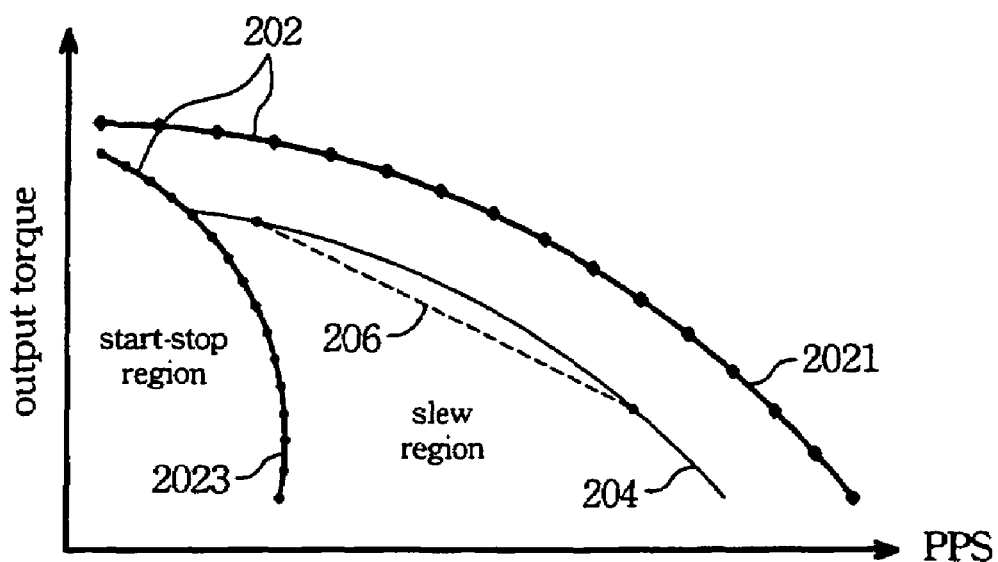
FIG. 5 is a graph of the real accelerating curve of the second embodiment of the present invention.

Referring to FIG. 5, which is a graph of the real accelerating curve 206 of the second embodiment of the present invention. In the second embodiment of the present invention, the real accelerating curve is a straight line between the corresponding point of the current rotational speed and a corresponding point of the target rotational speed.

Figure 6:
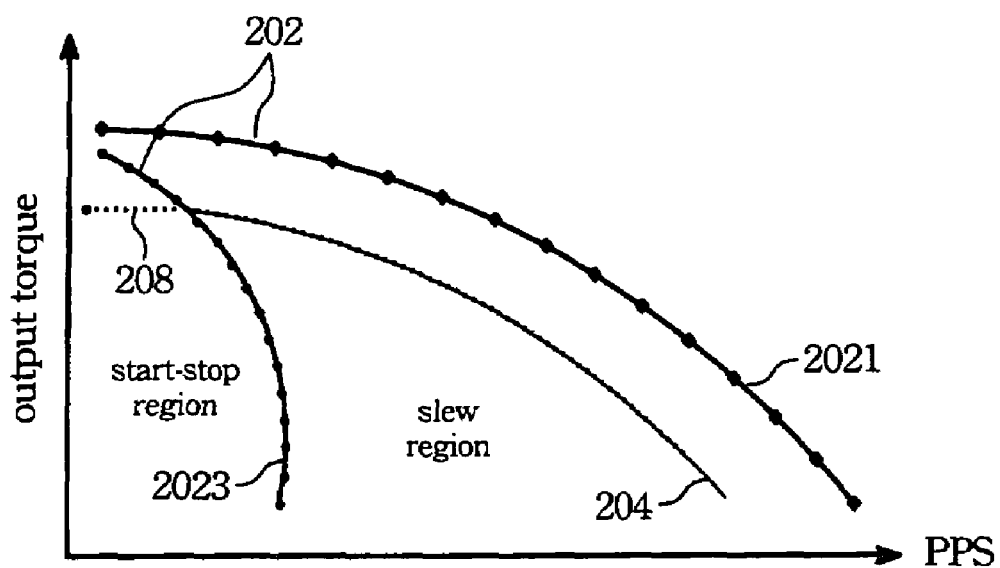
FIG. 6 is a graph of the real accelerating curve of the third embodiment of the present invention.

Referring to the FIG. 6, which is a graph of the real accelerating curve 208 of the third embodiment of the present invention. When the current rotational speed and the current output torque is below the pull-in torque curve 2023, the safety accelerating curve 208 will be defined to include two parts, one is a horizontal line and the other is a quadratic curve. The horizontal line is extended from the corresponding point of the current rotational speed to a middle point on the safety accelerating curve. The quadratic curve component is initialed from the middle point to a corresponding point of the target rotational speed on the safety accelerating curve.

There must emphasized that while the invention has been described in several preferred embodiments, it is understood that the words which have been used are words of description rather than words of limitation and that changes within the purview of the appended claims may be made without departing from the scope and spirit of the invention in its broader aspect.

After the controller 102 generates the real accelerating curve, the controller 102 would transfer the real accelerating curve as a control signal. The pulse generator 104 is used for receiving the control signal which comprises data represented the real accelerating curve, and then transferring the data to a pulse signal. A driver 106 is used for receiving the pulse signal and then driving the stepper motor 20 accelerating to the target rotational speed in accordance with the real accelerating curve. Therefore, the stepper motor 20 could be accelerated in the safety region and in the efficient way, and the "out-of-step" and "out-of-speed" won't happen in the present invention.

Figure 7:
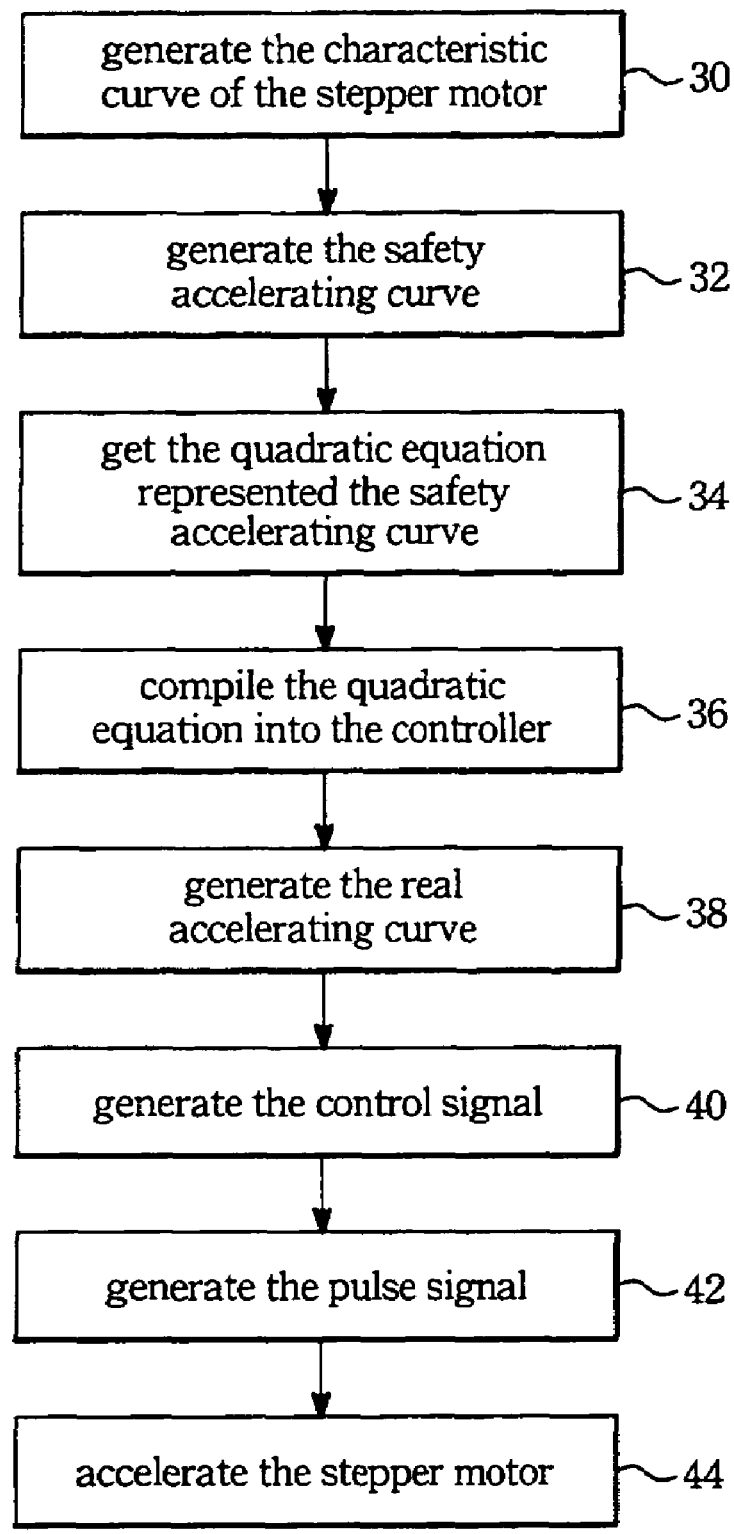
FIG. 7 is a flow chart of the stepper motor accelerating method according to the present invention.

Referring to FIG. 7, which is a flow chart of the stepper motor accelerating method according to the present invention. Upcoming description would in coordination with the flow chart for detail explaining the process of the present invention. The stepper motor accelerating method comprises:

Step 30: generate the characteristic curve 202 of the stepper motor 20 by doing a plurality of tests then getting a plurality of pull-out dots.

Step 32: shift the plurality of pull-out dots to get a plurality of safety dots with a safety margin.

Step 34: input a plurality of safety dots into a function $T(f)=a \times f^2+b \times f+r$, to solve a, b, and r, then get a quadratic equation to represent the safety accelerating curve.

Step 36: compile the quadratic equation into the controller 102.

Step 38: the controller 102 generates a real accelerating curve basing on the quadratic equation, the current rotational speed, and the target rotational speed.

Step 40: the controller 102 generates a control signal and transmits the control signal to the pulse generator 104 basing on the real accelerating curve.

Step 42: the pulse generator 104 transfers the control signal to the pulse signal.

Step 44: the driver 106 accelerates the stepper motor 20 to the target rotational speed in accordance with the real accelerating curve.

The present invention considers the problems generated in the prior art which uses the linear acceleration, and provides a completed solution to solve the problems. The present invention also considers the characteristics of the stepper motor, so the accelerating range is limited below the pull-out torque curve. For this reason, the present invention won't accelerate out of the pull-out torque curve. Moreover, because the accelerating process of the present invention is matched the characteristics of the stepper motor, the efficiency of acceleration is better than prior art.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the fill extent indicated by the broad general meaning of the terms in which the appended claims are expressed.

What is claimed is:

1. A method, comprising:
    storing an acceleration curve for a stepper motor, the acceleration curve being substantially similar to a pull-out torque curve of the stepper motor and at least partially lying within a slew region of the stepper motor, the acceleration curve being representative of a region of operation of the stepper motor capable of avoiding shifting of the stepper motor from the slew region to an out-of-step state or an out-of-speed state, or combinations thereof;
    generating a real accelerating curve based at least in part on the acceleration curve; and
    controlling the motor based at least in part on the real accelerating curve.

2. A method as claimed in claim 1, wherein the acceleration curve is generated by shifting one or more points on the pull-out torque curve by a predetermined amount along a line that is orthogonal to the pull-out torque curve at the one or more points to generate one or more points of the acceleration curve.

3. A method as claimed in claim 1, wherein the acceleration curve is generated by shifting one or more points on the pull-out torque curve by a predetermined amount along a line that is orthogonal to the pull-out torque curve at the one or more points to generate one or more points of the acceleration curve, and then curve fitting to arrive at an equation representative of the acceleration curve.

4. A method as claimed in claim 1, wherein the acceleration curve is generated by shifting one or more points on the pull-out torque curve by a predetermined amount along a line that is orthogonal to the pull-out torque curve at the one or more points to generate one or more points of the acceleration curve, and then curve fitting to arrive at a quadratic equation representative of the acceleration curve.

5. A method as claimed in claim 1, wherein the real acceleration curve comprises the acceleration curve.

6. A method as claimed in claim 1, wherein the real acceleration curve comprises a line between a point corresponding to a current rotational speed on the acceleration curve and a point corresponding to a target rotation speed on the acceleration curve.

7. A method as claimed in claim 1 wherein, the acceleration curve comprises a horizontal line for a rotation speed of the stepper motor below a pull-in torque curve of the stepper motor.

8. An apparatus, comprising:
   means for storing an acceleration curve for a stepper motor, the acceleration curve being substantially similar to a pull-out torque curve of the stepper motor and at least partially lying within a slew region of the stepper motor, the acceleration curve being representative of a region of operation of the stepper motor capable of avoiding shifting of the stepper motor from the slew region to an out-of-step state or an out-of-speed state, or combinations thereof;
   means for generating a real accelerating curve based at least in part on the acceleration curve; and
   means for controlling the motor based at least in part on the real accelerating curve.

9. An apparatus as claimed in claim 1, wherein the acceleration curve is generated by shifting one or more points on the pull-out torque curve by a predetermined amount along a line that is orthogonal to the pull-out torque curve at the one or more points to generate one or more points of the acceleration curve.

10. An apparatus as claimed in claim 1, wherein the acceleration curve is generated by shifting one or more points on the pull-out torque curve by a predetermined amount along a line that is orthogonal to the pull-out torque curve at the one or more points to generate one or more points of the acceleration curve, and then curve fitting to arrive at an equation representative of the acceleration curve.

11. An apparatus as claimed in claim 1, wherein the acceleration curve is generated by shifting one or more points on the pull-out torque curve by a predetermined amount along a line that is orthogonal to the pull-out torque curve at the one or more points to generate one or more points of the acceleration curve, and then curve fitting to arrive at a quadratic equation representative of the acceleration curve.

12. An apparatus as claimed in claim 1, wherein the real acceleration curve comprises the acceleration curve.

13. An apparatus as claimed in claim 1, wherein the real acceleration curve comprises a line between a point corresponding to a current rotational speed on the acceleration curve and a point corresponding to a target rotation speed on the acceleration curve.

14. An apparatus as claimed in claim 8, wherein the acceleration curve comprises a horizontal line for a rotation speed of the stepper motor below a pull-in torque curve of the stepper motor.

* * * * *

UNITED STATES PATENT AND TRADEMARK OFFICE
CERTIFICATE OF CORRECTION

PATENT NO. : 7,327,116 B2
APPLICATION NO. : 11/510348
DATED : February 5, 2008
INVENTOR(S) : Ping-Hung Kuo It is certified that error appears in the above-identified patent and that said Letters Patent is hereby corrected as shown below:

Figure 7
Step 34, change "represented" to -- representing -- or -- represented by --

Column 1
Line 23, change "outputting" to -- outputs --
Line 26, change "like pulse" to -- like a pulse --
Line 29, change "motor to rotate" to -- motor rotate --
Line 41, change "the FIG 1" to -- FIG 1 --
Line 42, change "the FIG 1" to -- FIG 1 --
Line 43, change "of stepper" to -- of a stepper --
Line 66, change "called slew" to -- called the slew --

Figure 2:
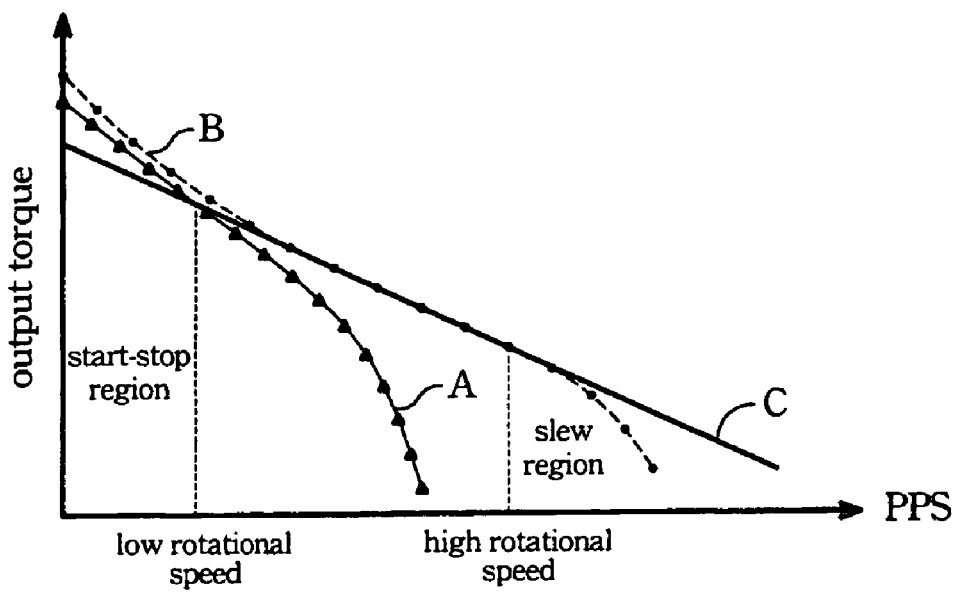
FIG. 2 is a graph of a conventional accelerating curve adapted in the conventional stepper motor.

Column 2
Line 5/6, change "motor stop" to -- motor to stop --
Line 6, change "would happen" to -- can happen --
Line 7, change "will cause the" to -- will cause --
Line 9, change "and don't cause the coil" to -- and doesn't cause coil --
Line 10, change "even the exciter coil still" to -- even though the exciter coil is still --
Line 11, change "motor is controlled" to -- motor being controlled --
Line 15, change "inverse" to -- inversely --
Line 18, change "decreasing" to -- to decrease --
Line 19, change "mostly are" to -- is mostly --
Line 24, change "the FIG 2" to -- FIG 2 --
Line 25, change "the FIG 2" to -- FIG 2 --
Line 29, change "and not" to -- and does not --
Line 36/37, change "result the" to -- result in the --
Line 48, change "adapted a" to -- adapted to a --
Line 49, change "stepper motor out" to -- stepper motor from being out --
Line 50, change "torque during" to -- torque curve during --
Line 62, change "which are complied" to -- which is complied --

Column 3
Line 2, change "represented the" to -- represented by the --
Line 28, change "initialed" to -- initiated --
Line 36, change "won't be happen" to -- won't happen --

Column 4
Line 6, change "have to do a lot" to -- has to be a lot --
Line 8, change "is" to -- has --

UNITED STATES PATENT AND TRADEMARK OFFICE
CERTIFICATE OF CORRECTION

| | |
|---|---|
| PATENT NO. | : 7,327,116 B2 |
| APPLICATION NO. | : 11/510348 |
| DATED | : February 5, 2008 |
| INVENTOR(S) | : Ping-Hung Kuo |

It is certified that error appears in the above-identified patent and that said Letters Patent is hereby corrected as shown below:

Line 8, change "pulse" to -- pulses --
Line 9, change "and to record" to -- and a record --
Line 22, change "As description" to -- As in the description --
Line 24, change "2022" to -- 2023 --
Line 25, change "have" to -- has --
Line 27, change "introduces" to -- introduce --
Line 52, change "input" to -- inputting --
Line 55 - 57, change "there has many software in the market has function to do the curve fitting more complexity and precisely." to -- there are many software applications in the market that perform the curve fitting function more completely and precisely. --
Line 58, change "is" to -- being --
Line 60, change "stepper motor to" to -- stepper motor and causing it to --
Line 61, change "speed" to -- speeds --

Column 5
Line 21, change "initialed" to -- initiated --
Line 24, change "There must emphasized" to -- It must be emphasized --
Line 34/35, change "represented" to -- representing -- or -- represented by --
Line 41, remove [the] --
Line 45 - 47, change "Upcoming description would in coordination with the flow chart for detail explaining the process of the present invention." to -- The following description will be used in conjunction with the flow chart for explaining in detail the process of the present invention. --
Line 61, change "basing" to -- based --
Line 64, change "basing" to -- based --

Column 6
Line 5, change "uses the linear" to -- uses linear --
Line 12, change "matched the" to -- matched to the --
Line 14, change "than prior art" to -- than the prior art --
Line 20, change "fill" to -- full --

Column 7
Line 19, change "claim 1" to -- Claim 8 --
Line 25, change "claim 1" to -- claim 8 --

UNITED STATES PATENT AND TRADEMARK OFFICE
CERTIFICATE OF CORRECTION

PATENT NO. : 7,327,116 B2
APPLICATION NO. : 11/510348
DATED : February 5, 2008
INVENTOR(S) : Ping-Hung Kuo It is certified that error appears in the above-identified patent and that said Letters Patent is hereby corrected as shown below:

<u>Column 8</u>
Line 6, change "claim 1" to -- claim 8 --
Line 14, change "claim 1" to -- claim 8 --
Line 16, change "claim 1" to -- claim 8 --

Signed and Sealed this

Third Day of February, 2009

JOHN DOLL
*Acting Director of the United States Patent and Trademark Office*